(12) United States Patent
Fan et al.

(10) Patent No.: US 12,705,475 B2
(45) Date of Patent: Aug. 11, 2026

(54) SIMULTANEOUS MEASUREMENTS OF GRADIENTS IN OPTICAL NETWORKS

(71) Applicant: The Board of Trustees of the Leland Stanford Junior University, Stanford, CA (US)

(72) Inventors: Shanhui Fan, Stanford, CA (US); Tyler William Hughes, San Diego, CA (US); David A.B. Miller, Stanford, CA (US); Sunil K. Pai, Stanford, CA (US); Olav Solgaard, Stanford, CA (US); Ian A.D. Williamson, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 1191 days.

(21) Appl. No.: 17/639,054

(22) PCT Filed: Sep. 9, 2020

(86) PCT No.: PCT/US2020/049913

§ 371 (c)(1),
(2) Date: Feb. 28, 2022

(87) PCT Pub. No.: WO2021/050526

PCT Pub. Date: Mar. 18, 2021

(65) Prior Publication Data

US 2022/0327369 A1 Oct. 13, 2022

Related U.S. Application Data

(60) Provisional application No. 62/897,657, filed on Sep. 9, 2019.

(51) Int. Cl.
*G06N 3/067* (2006.01)

(52) U.S. Cl.
CPC .................................... *G06N 3/067* (2013.01)

(58) Field of Classification Search
CPC ........ G06N 3/067; G06N 3/0675; G06N 3/08; G06N 3/084

(Continued)

(56) References Cited

U.S. PATENT DOCUMENTS 7,062,166 B2 * 6/2006 Jacobowitz .......... H04B 10/697 398/32
10,042,190 B2 * 8/2018 Liu ......................... G02F 1/225
(Continued)

OTHER PUBLICATIONS

"High-speed, model-free adaptive control using parallel synchronous detection" by Loizos et al., 20th Symposium on Integrated Circuits and System Design (SBCCI07), pp. 224-229 (Year: 2007).*
(Continued)

*Primary Examiner* — Robert Tavlykaev
(74) *Attorney, Agent, or Firm* — LUMEN PATENT FIRM

(57) ABSTRACT

Improved training of optical neural networks is provided. In one example: 1) we choose input and target vectors, we program those into an input vector generator and a measurement unit, respectively, we turn on the optical input source power, and we monitor the electrical signal representing the cost function. 2) we can then modulate two or more controllable elements inside the optical network at different frequencies and look for the size and sign of the corresponding distinct AC variations in the measured cost function, simultaneously giving us the gradients with respect to each element.

7 Claims, 7 Drawing Sheets

(58) Field of Classification Search
USPC .......................................................... 706/40
See application file for complete search history.

(56) References Cited

U.S. PATENT DOCUMENTS

| | | | | |
|---|---|---|---|---|
| 10,338,319 | B2 | 7/2019 | Miller | |
| 10,496,069 | B2 * | 12/2019 | Nazarathy | G05B 13/04 |
| 11,460,753 | B2 * | 10/2022 | Hughes | G06V 10/955 |
| 12,026,615 | B2 * | 7/2024 | Hughes | G06N 3/09 |
| 2017/0351293 | A1 | 12/2017 | Carolan | |
| 2018/0061344 | A1 | 3/2018 | Kurokawa | |
| 2018/0259707 | A1 | 9/2018 | Zalevsky | |
| 2020/0250532 | A1 * | 8/2020 | Shen | G06N 3/0675 |

OTHER PUBLICATIONS

"Parallel Dither and Dropout for Regularising Deep Neural Networks" by Simpson, arXiv preprint arXiv:1508.07130 (Year: 2015).*
"The multidither principle in adaptive optics" by O'Meara, J. Opt. Soc. Am., vol. 67, No. 3, pp. 306-315 (Year: 1977).*

* cited by examiner

SIMULTANEOUS MEASUREMENTS OF GRADIENTS IN OPTICAL NETWORKS

CROSS-REFERENCE TO RELATED APPLICATIONS

This application is a 371 of PCT application PCT/US2020/049913 filed Sep. 9, 2020. PCT application PCT/US2020/049913 claims the benefit of U.S. Provisional application 62/897,657 filed Sep. 9, 2019.

STATEMENT OF GOVERNMENT SPONSORED SUPPORT

This invention was made with Government support under contract FA9550-17-1-0002 awarded by the Air Force Office of Scientific Research. The Government has certain rights in the invention.

FIELD OF THE INVENTION

This invention relates to training methods for optical neural networks.

BACKGROUND

Training a neural network often involves adjustments of hardware parameters of the network in the presence of training data in order to improve performance (e.g., classifying the training data into categories). Training optical neural networks presents special challenges, since the internal signals within the network are optical, not electrical. As a result, it can be more difficult to obtain required information for training in optical neural networks than in other kinds of neural networks. One kind of information that is frequently needed in such training is derivatives of a cost function being optimized vs. control inputs. Often such derivatives are referred to as gradients, since there are typically a large number of control inputs that need to be optimally set, so derivatives are taken with respect to many different control inputs.

One approach that has been considered is to physically implement the adjoint variable method in photonic hardware in order to provide photonic signals that provide the necessary gradient information. This approach requires intensity measurements inside the mesh combined with some further computations and optical processes. Accordingly, it would be an advance in the art to provide improved training of optical neural networks.

SUMMARY

We provide an efficient and fast way of measuring such gradients simultaneously and in parallel. This approach may allow optical neural networks to implement fast and low power learning.

An exemplary embodiment is a method of training a photonic neural network, where the method includes:

1) providing an optical network (e.g., 102 on FIGS. 1-2) having two or more optical inputs, two or more optical outputs and two or more control inputs, where control signals provided to the control inputs determine an input-output relation between the optical inputs and the optical outputs;
2) providing one or more predetermined input training patterns (e.g., $|X_0\rangle$ on FIG. 2, see also FIG. 5) to the optical inputs of the optical network;
3) providing an adjustable output analyzer (e.g., 204 on FIG. 2, see also FIGS. 8-9) connected to the optical outputs of the optical network and configured to provide a cost function output;
4) simultaneously measuring two or more derivatives of the cost function (e.g., $\mathfrak{L}$) with respect to the control signals (e.g., $v_{lq}$) as part of training the photonic neural network with the one or more predetermined input training patterns. Elsewhere in the description it is convenient to refer to these derivatives as 'gradients', in accordance with common usage in the literature.
5) Here the simultaneously measuring two or more derivatives of the cost function with respect to the control signals is done by dithering two or more of the control signals at two or more distinct dither frequencies and measuring corresponding distinct frequency components in the cost function output. These corresponding frequencies can be at the dither frequencies (if the input training patterns are DC signals) or heterodyne shifted relative to the dither frequencies (if the input training patterns are modulated signals).

Two or more predetermined input training patterns can be provided to the optical inputs of the optical network at various times, whereby the two or more derivatives of the cost function are analog time averages over the two or more predetermined input training patterns.

Two or more predetermined input training patterns can be provided to the optical inputs of the optical network at two or more distinct wavelengths, whereby the two or more derivatives of the cost function are analog wavelength averages over the two or more predetermined input training patterns.

The one or more predetermined input training patterns can be provided as modulated input training patterns, whereby frequency components in the cost function output resulting from the two or more distinct dither frequencies are heterodyne shifted away from the two or more distinct dither frequencies.

The method can further include adjusting the control signals to optimize the cost function with an optimization method that makes use of the two or more derivatives of the cost function with respect to the control signals, whereby the photonic neural network is trained according to the one or more predetermined input training patterns.

The optical network can include two or more meshes of linear optical components connected in alternating series via one or more nonlinearity units, where the control inputs include at least inputs to each of the two or more meshes of linear optical components. E.g., meshes $W_1$, $W_2$, . . . alternating with nonlinearity units $f_1$, $f_2$, . . . on FIG. 1.

The optical network can include at least one optical element having a compound control input, where the compound control input includes a first input and a second input, where the first input has a lower bandwidth than the second input, and where a dither of the compound control input is delivered via the second input. An example of this is shown on FIG. 6, where the input to phase shifter 602 is the first input and the input to phase shifter 604 is the second input.

Applications include optical neural networks and machine learning, optical communications systems, and self-training sensing systems.

In some exemplary embodiments:

1) we choose input and target vectors, we program those into the input vector generator and the measurement unit, respectively, we turn on the optical input source power, and we monitor the electrical signal representing the cost function.

2) we can then modulate a controllable element inside the network and look for the size and sign of the corresponding variation in the measured cost function, giving us the gradient with respect to that element 3) we can modulate multiple controllable elements at once at different frequencies, and extract all the resulting gradients at once simultaneously as the corresponding amplitudes and signs of the resulting frequency components in the measured cost function output, giving us all these gradients in parallel.

Significant advantages are provided. This approach would substantially reduce the time required for optimizing arbitrary optical networks so they solve particular problems, including learning in neural network and machine learning applications. Generally, optical approaches have the major potential advantage of performing matrix multiplications quickly and at no marginal cost, in strong contrast to electronic systems.

Further advantages include:

a) we do not need to know the form of the response of the controllable elements in the meshes to the drive voltages (for example, we do not need to know or presume that phase shifts change linearly with drive), though in cases where the "two-stage" approach is used, some a priori knowledge of the elements may be needed.

b) we do not need to know specifically what kind of controllable elements we are using (for example, the elements could be phase shifters, but they could also be controllable directional couplers).

c) we do not need to have a specific architecture or connectivity of controllable elements. Any reconfigurable linear optical mesh will do.

d) we do not need to know the form of the response of the nonlinear units in order to deduce the gradients; the method will incorporate the effects of these directly.

e) we do not need to calibrate anything inside the network; only the generators of the input and target vectors need to be calibrated so they can generate the vectors we need.

f) we do not generally need any "look-up" tables for elements inside the network.

g) we do not need any calculations in an external calculating machine other than those required to generate the input and target vector settings.

h) we do not need to generate any physical adjoint field (as used in adjoint and/or backpropagation approaches as in the literature).

i) we do not need to measure intensities, powers, or interference patterns at points inside the network.

DETAILED DESCRIPTION

A) Introduction

Figure 1:
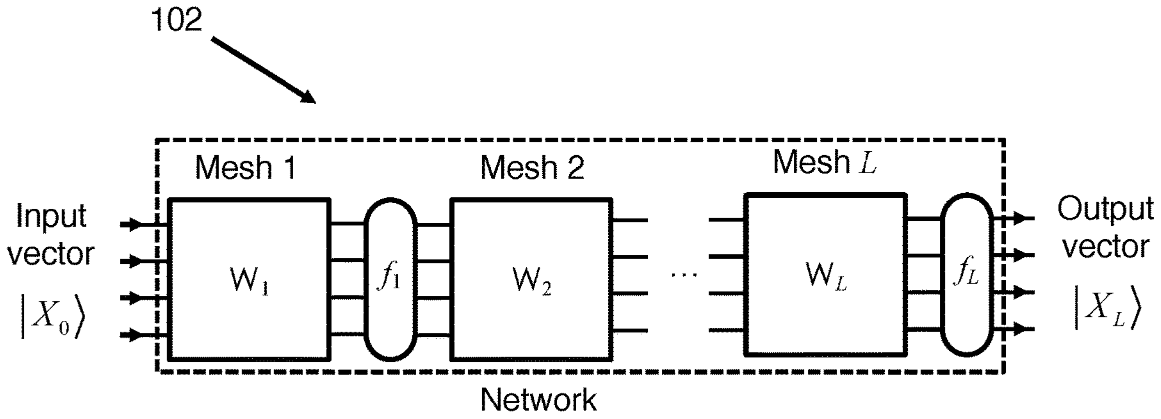
FIG. 1 shows an exemplary optical neural network configuration.

It is now possible to make complicated optical networks of many components. These have applications in many areas, including in separating mixed modes in optical communications, for quantum computing, and for optical neural networks. Silicon photonics technology is a particularly useful approach to making such networks. Typical networks involve meshes of Mach-Zehnder waveguide interferometers. The Mach-Zehnder interferometers can function as 2×2 adjustable blocks, which can set the relative phase and amplitude relation between two optical inputs and two optical outputs, with such inputs and outputs typically being provided in the form of optical waves in waveguides. Other forms of equivalent 2×2 blocks are possible, as in U.S. Pat. No. 10,338,319, which provides an alternative approach including a controllable coupling element. Generally, with controllable phase shifter elements and, optionally, other controllable coupling elements, complex mathematical operations are possible in such meshes of 2×2 optical elements, such as arbitrary unitary and non-unitary matrix operations. See also U.S. Pat. No. 10,534,189, hereby incorporated by reference in its entirety. Below, we will refer to all such elements that can be controlled so as to affect the operation of the optical network, such as phase shifters or controllable couplers or possibly other controllable optical elements, as "elements" or "controllable elements".

Because such networks can be very complex and because precise settings of network elements are very important in systems involving interference of optical waves, it is important to have ways of setting up such networks so they perform their desired function. For networks that are to perform linear functions, such as the equivalent of matrix multiplication, progressive methods are known for setting controllable elements that allow the mesh to be set up to perform a given such linear operation. The literature has many explicit examples of networks with such controllable elements, so we will not explicitly show the details of such networks further here.

Another approach to setting up such networks can involve more global optimization algorithms that can be intended to "train" the network to perform some function. One general approach to such training is to define some cost function that can be measured at or from the output of the network, such as the measured power in some photodetector or photodetectors or some quantity calculated from such measurements, and then to adjust the controllable elements in the network so as to optimize (e.g., maximize, or, alternatively, minimize) such a cost function. In such optimizations, it is desirable to be able to measure changes in the cost function as each parameter or controllable element (e.g., phase shifter or controllable coupler) is varied. We can refer to the amount of change in the cost function resulting from a small change in a controllable element or in the drive, such as a control voltage, that leads to such a change in the controllable element as a "gradient" (with respect to that change in the element setting or that drive). Such measured gradients or changes can then be used as inputs to some optimization algorithm, such as one based on gradient descent, to then make related changes to the parameter settings as part of the overall optimization process.

Such optimization processes are particularly important for artificial neural networks. In particular, they can allow the optical neural network to be trained directly, rather than requiring a separate external training process, allowing the system to implement approaches like machine learning directly. Key to any such process is the ability to conveniently and rapidly make the necessary measurements of such gradients or changes.

Previous approaches required intensity measurements inside the mesh combined with some further computations and optical processes. Here, we provide a method that not only avoids such intensity measurements but allows the direct and simultaneous measurement of multiple gradients corresponding to changes in multiple network elements, based only on measurements made outside the mesh. This approach can simplify and speed up the process of setting up such meshes by optimization, and can be used directly in training optical neural networks.

B) Architectures and Approach

An optical architecture based on interferometer meshes that could in principle implement a layered neural network is known from the literature. This architecture alternates linear transforms performed by the interferometric meshes ("Optical interference units"—OIU) with "columns" of nonlinear elements ("Optical nonlinearity units"—ONU). A key point in implementing a training method for such a mesh is that we need to know how the cost function $\mathfrak{L}$ varies as we change the linear transform $W_l$ corresponding to the lth mesh or OIU.

In our method, we directly measure appropriate gradients, which we can also view equivalently as the derivatives of the cost function. In this approach, in a simple version, we can directly measure $\mathfrak{L}$ at the output of the whole system as an optical power. Then we can directly vary the drive of each controllable element, such as a phase shifter or controllable coupler, in the meshes. For the sake of definiteness we will refer to such drive of an element as the drive voltage $v_{lq}$ for element q in mesh l, though we understand that such drive could be some other quantity, such as displacement of part of an element in space or such as an electrical current, for example. We then measure the resulting change in the optical power that corresponds to $\mathfrak{L}$. That then directly gives the desired gradient $\partial \mathfrak{L}/\partial v_{lq}$, and we can then use those gradients in a learning strategy to update the drive voltage of element q in mesh l.

Now, such an approach, based on measuring the cost function before and after some such change in the drive or setting of a controllable element, is known for the case of varying one element at a time, and can be called a finite difference method for gradient measurement. But such an approach would be time-consuming to implement because we would need successive such measurements for the case of changes in each such element in the mesh. Our approach circumvents this limitation, allowing simultaneous (or "parallel") measurements of multiple such gradients.

For the purposes of discussion and as an example, we presume that the architecture of the network itself is as in network 102 as shown on FIG. 1. Notationally, we will use a Dirac notation for vectors that are columns of numbers, as in $|X\rangle$, and upper-case letters, as in W, for the linear operators corresponding to the meshes. Such vectors here represent the set of modal amplitudes in a set of single-mode guides, as in the 4 guides shown. (4 is just as an example number of such guides in the architecture; other numbers of guides are possible, of course.) Nonlinearity units are labelled as $f_1$, $f_2$, and so on. In FIG. 1 we indicate L such meshes and nonlinear units.

Figure 2:
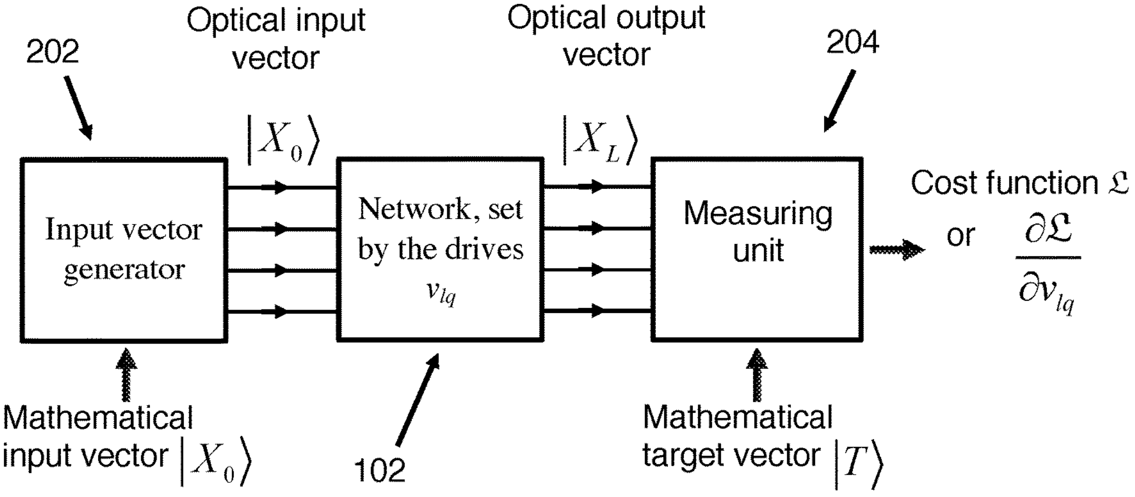
FIG. 2 shows an exemplary configuration for providing inputs to an optical neural network and for measuring its outputs.

For an example training approach, we then combine network 102 with two further objects, as shown in FIG. 2. This figure shows an exemplary architecture of the system including a generator 202 for optical input vectors and a measuring unit 204 that directly measures the changes in the cost function as drive parameters $v_{lq}$ are changed. The mathematical input vector $|X_0\rangle$ is used to set appropriate parameters in the input vector generator, and the mathematical target vector $|T\rangle$ is used to set parameters in the measuring unit so that it measures the cost function for a given network optical output vector $|X_L\rangle$.

More specifically, we add some apparatus at the input of the system—the "input vector generator" 202—that takes the mathematical input vectors $|X_0\rangle$, which might be the training vectors, for example, and turns them into corresponding vectors $|X_0\rangle$ of actual mode amplitudes in the waveguide inputs to the mesh. Then, after the mesh 102, we need some "measuring unit" 204 that measures a cost function $\mathfrak{L}$ constructed from the comparison of the output vector $|X_L\rangle$ and some mathematical target vector $|T\rangle$.

This measuring unit will allow us to measure the cost function directly as an optical power or a corresponding photocurrent (or voltage) or other measurable physical quantity. Then, as we change a drive $v_{lq}$ of one of the controllable elements in the mesh, we can directly see the resulting change in $\mathfrak{L}$ or, equivalently, measure the gradient $\partial \mathfrak{L}/\partial v_{lq}$.

Figure 3:
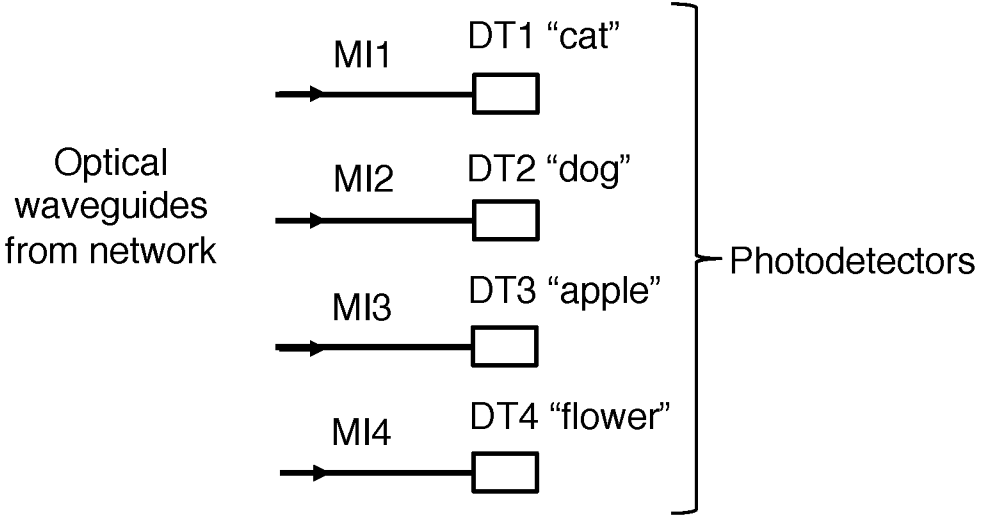
FIG. 3 shows an exemplary 4 channel measuring unit.

FIG. 3 shows a simple version of a measuring unit, including 4 photodetectors (DT1, DT2, DT3, DT4), each connected to one of the output waveguides of the network (MI1, MI2, MI3, MI4), so the amplitudes of the optical signals in these waveguides constitute the output vector $|X_L\rangle$. In this example case, the choice of the target vector corresponds to the choice of which photodetector output we examine. So, for the target vector labelled "dog", we examine the output of photodetector DT2. In this case, the cost function $\mathfrak{L}$ is the output signal from this photodetector, and a larger output signal from this photodetector corresponds to a stronger estimate that the training vector corresponds to the category labelled "dog".

Figure 4:
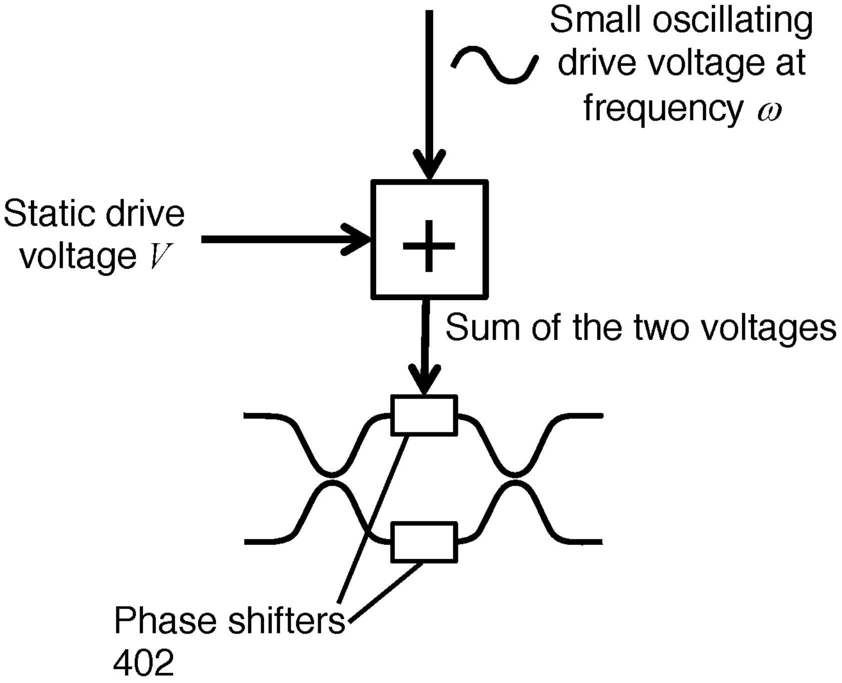
FIG. 4 illustrates one way to provide a dither to a control input.

It might seem that we therefore have to step through all the elements in the network, one after the other, to evaluate all of the gradients $\partial \mathfrak{L}/\partial v_{lq}$. However, now we come to a key step in our approach. FIG. 4 illustrates an exemplary method to simultaneously apply a static electrical drive voltage V and a small oscillating drive voltage at some frequency w to a phase shifting element (e.g., phase shifters 402 as shown) in an optical interferometer by using an electrical adding circuit. Note first that if we modulate the drive of each element with a small oscillating component at some frequency $\omega_{lq}$, then the gradient will show up in the measurable physical quantity (such as an output voltage from a photodetector amplifier circuit) as the amplitude of the (oscillating) modulation of this measured quantity (and hence measured cost function) at this frequency $\omega_{lq}$.

The amplitude of this oscillation constitutes the measure of the corresponding gradient (including the sign of the gradient, which appears as an "antiphase" signal for negative signs). Such a gradient signal (including the sign) is easily extracted by standard electronic circuits; one approach would use a "lock-in" amplifier for example to measure the component of the electrical signal at some such frequency $\omega_{lq}$. Other approaches could include digital signal processing techniques.

Now, if we modulate a number of drives for different devices at different frequencies, then we will be able simultaneously to detect multiple different gradients at once by detecting the amplitudes of oscillation of the photodetector signal at each of these different frequencies. Again, the electronic circuits to extract all such frequency components at once from these different frequencies of modulations are straightforward in principle and known to those skilled in the art. One approach would be to connect the output voltage from the photodetector amplifier circuit simultaneously and in parallel to the inputs of multiple lock-in amplifiers, each looking for the component at a different frequency of interest, and hence each measuring a different gradient. Another approach would use digital signal processing techniques to extract components at the necessary different frequencies from a set of samples of the signal amplitude at multiple different times, as known to those skilled in the art.

An important point is that, if we keep all the different frequencies within one octave (i.e., between a lower frequency $\omega_{low}$ and an upper frequency $\omega_{high}<2\omega_{low}$), then any intermodulation signals (from sums and differences of the different frequencies frequencies) and any higher order derivative signals (e.g., second derivatives would show up at twice the modulation frequency) will lie outside the octave, and the measurements are then essentially non-interacting.

Just how many different controllable elements we would drive at once with such different frequencies is a matter of engineering choice. We do not have to drive all the controllable elements at the same time, and can work in groups (e.g., one mesh at a time) if that is more convenient, but we see that we can work with two or more controllable elements being varied simultaneously, and we can measure simultaneously the required gradients associated with those two or more controllable elements.

So the net result of this approach is that, in one "forward" process, we can simultaneously yet independently measure the gradient of the cost function with respect to variations in multiple ones of the drives of the elements in the mesh. Hence, we can greatly speed up a key process required for optimizing such networks.

C) Generating Input Vectors

Figure 5:
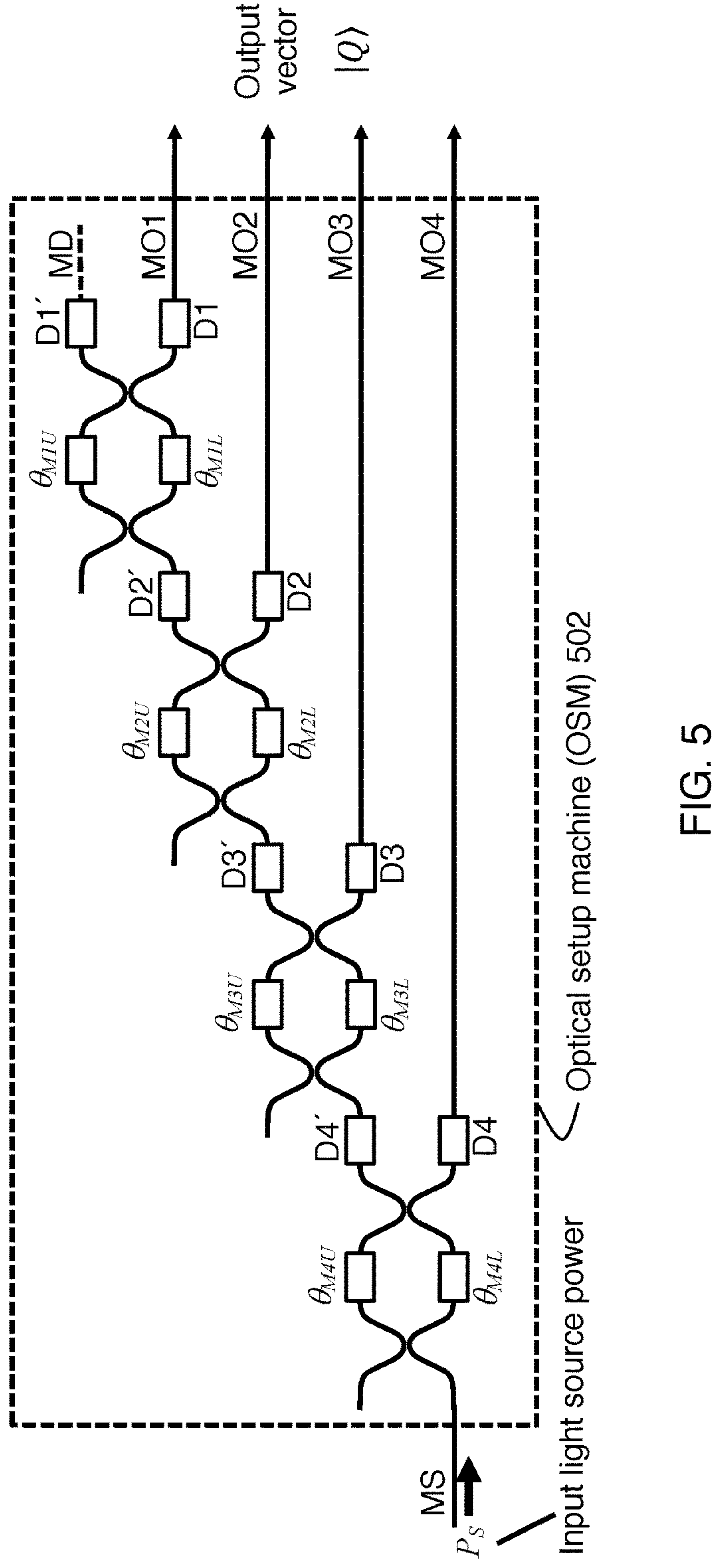
FIG. 5 shows an example of an output setup machine for creating input training patterns.

In using such a network that works by interference of light inside the mesh units, the input vector preferably includes mutually coherent fields at the same polarization. We can generate such vectors using an "optical setup machine" (OSM). Such an OSM 502 is shown in FIG. 5 for the example case of four output waveguides. Using either detectors D1 to D4, or detectors D1' to D4', a machine like this can calibrate itself based on power $P_s$ from a light source shining into waveguide MS. This process will result in all the phase shifters (denoted by θ with various subscripts) being calibrated. (Only one of these two sets of detectors is required.) Any such detectors (with the possible exception of D1') should preferably be mostly transparent, detecting only a small fraction of the power that is used in calibrating the system. After calibration, it is then straightforward to calculate the necessary settings of these phase shifters to create any desired output vector $|Q\rangle$ of waveguide mode amplitudes. All those amplitudes are derived from the same input light source power in waveguide MS, and so are mutually coherent in the same polarization as preferred.

Technically, a method like that in FIG. 5 gives any desired vector at the outputs with phase relative to some arbitrary reference phase in each waveguide. That arbitrary phase essentially results from a corresponding arbitrary choice of what we consider to be "zero" phase delay in the phase shifter pairs inside a given interferometer. Generally, then, a given output vector $|Q\rangle$ has phases relative to an arbitrary but fixed set of reference phases. In the operation of the larger system, such an arbitrary set of reference phases typically does not matter as long as it is fixed. Differences in such reference phases are effectively absorbed in the settings of subsequent phase shifters, but it does mean that there should always be a phase shifter or a phase shift available in the system for one of the two inputs of every interferometer. This is anyway the case in the standard networks used for arbitrary linear transforms.

So, with this OSM, we can mathematically choose some vector $|X_0\rangle$, then simply calculate the necessary phases in the Mach-Zehnder interferometers in the OSM, program those in by choosing the corresponding required drive voltages for the phase shifters in the OSM, turn on the input light source power $P_s$, and thereby generate the required corresponding vector $|X_0\rangle$ of modal amplitudes in the input guides to the network.

D) High-Speed Phase Shifting Elements

It can be desirable in making measurements to be able to look at modulations at relatively high frequencies, such as megahertz, or even gigahertz, frequencies. By increasing the modulation frequency range, we widen the available frequency band and so allow a larger set of modulated signals to be applied and detected simultaneously. Another equally important advantage is that at higher frequencies, low-frequency noise sources, such as "1/f" ("one over f") noise, well known to those skilled in the art, are relatively unimportant.

However, some controllable elements, such as those based on thermal changes in properties, such as phase shifters whose phase shift is controlled by temperature, or some micromechanical approaches whose phase shifts or coupling depend on physical displacements, may have restrictions on how fast they can make controllable changes. Other ways of making high-speed elements are known, including electro-optical effects and materials, though making large changes in necessary properties, such as refractive index, can be difficult with such effects. It is necessary to be able to make large changes in phase shifts or coupling strengths in setting up the elements in the network so it performs its desired function, in this approach, but the changes we want to make at the modulation frequencies to measure gradients need not be large.

Figure 6:
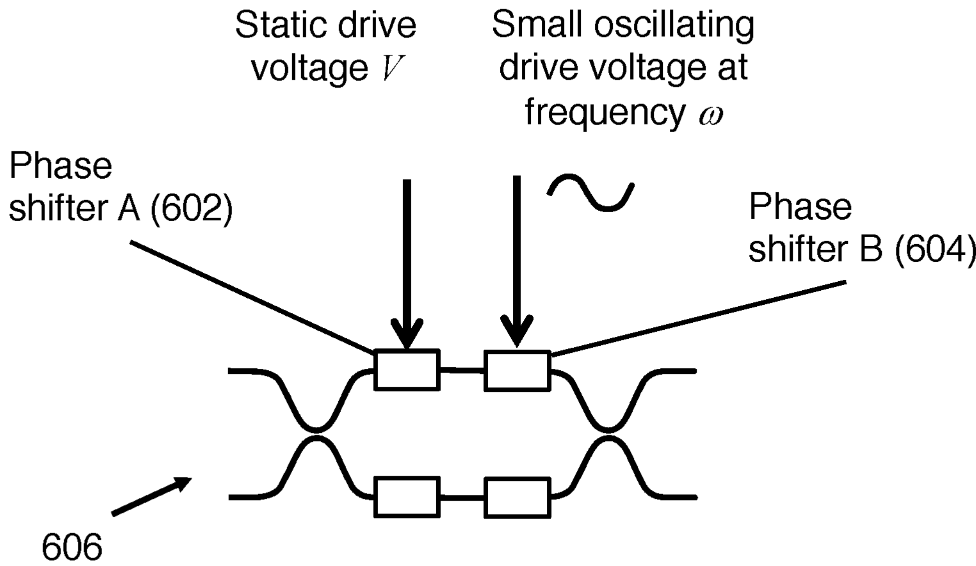
FIG. 6 shows another way to provide a dither to a control input.

So, we can consider a "two stage" controllable phase shifter element, with two phase shifter elements optically in series, as illustrated as phase shifter A and phase shifter B in FIG. 6, respectively referenced as 602 and 604. In such a scheme, the static drive voltage V can be used to control one phase shifter and a small oscillating voltage at frequency ω can be used to control the second phase shifter. (The roles of these two phase shifters can be interchanged; the optical series order can be chosen as convenient.) This approach is an alternative to that of FIG. 4, avoiding the need for a separate electrical adder circuit.

Conveniently, one of these two phase shifting elements can be a high-speed phase shifting element that is only required to make small changes in phase delay (phase shifter B in the example in FIG. 6), which we could refer to as "low amplitude" phase modulation. Then we would apply our modulation frequency at some convenient desired high frequency in the drive of such a high-speed element for the purposes of measuring gradients, and use the other phase shifting element (phase shifter A in FIG. 6), which can be a slow phase shifting element, for the actual control of the network.

Figure 7A:
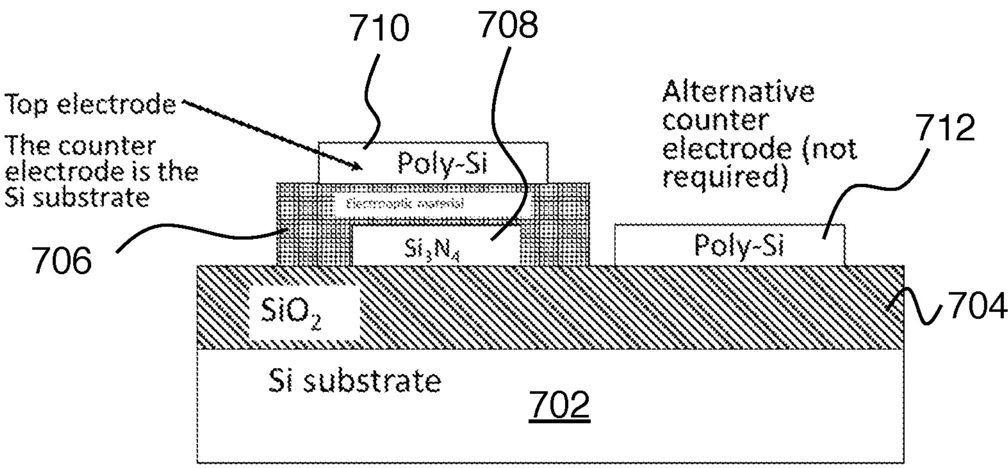
FIGS. 7A-B show an exemplary waveguide implementation of the architecture of FIG. 6.
Figure 7B:
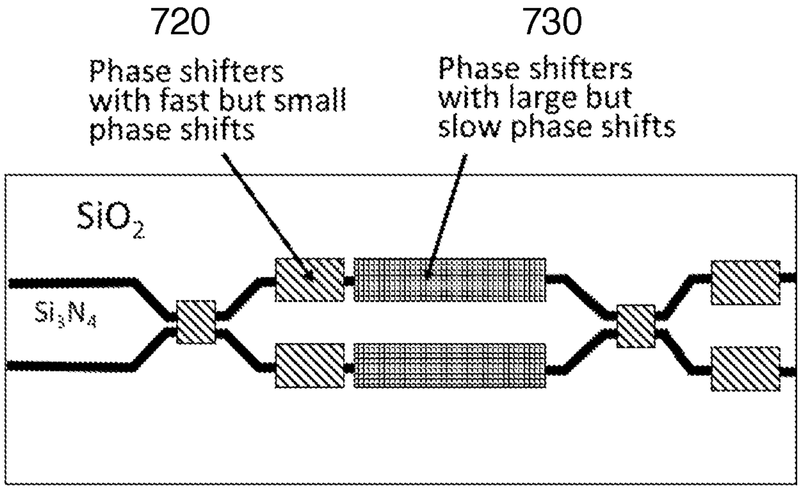

The high-speed, low-amplitude phase shifters can be implemented in a variety of ways. One possible basic structure is shown in FIGS. 7A-B. Here FIG. 7A is a cross section view and FIG. 7B is a roughly corresponding schematic top view. In this example, the electrooptic material 706 is shown as wrapped around the $Si_3N_4$ waveguide 708, but alternative designs are possible where the electrooptic material is localized only on top of the waveguide or spread across the whole mesh. In the latter case, the electrodes would still be localized. Further details on FIG. 7A are Si substrate 702, $SiO_2$ layer 704, poly-silicon top electrode 710 and an optional counter electrode 712 (in case Si substrate 702 is not used as the counter electrode). FIG. 7B schematically shows a top view of a waveguide interferometer having phase shifters 720 configured to provide fast and small phase shifts and having phase shifters 730 configured to provide large but slow phase shifts.

The electrooptical material shown in the cross section can be a polymer, an organic crystal (e.g., a liquid crystal (LCD)), a semiconductor or an inorganic crystal or any other electrooptic material (i.e., a material that changes its index of refraction in response to an electric field). If an electrooptic polymer is used, it can be "poled" to give it the electrooptic effect by either using corona poling or by using the electrode shown in the cross section to apply the poling field. If a semiconductor is used, the electrooptic effect can be created in many ways including the plasma effect, bandgap effects and quantum well effects. Electrooptic organic crystals comes in many different forms, including Liquid Crystals (LCDs). Many inorganic crystalline materials, including Lithium Niobate ($LiNbO_3$), exhibit the electrooptic effect and can be used in the configuration.

In an alternative implementation, we use an "optooptic" material (i.e. a material that changes its refractive index as a function of an applied optical field). The optooptic phase shifter could be addressed by laser beams pointed at the phase shifters.

The fast phase shifters can be placed in a multitude of ways in each MZI (Mach Zehnder Interferometer) as shown in FIGS. 7A-B. In many cases, only two fast phase modulators (one per slow phase shift) are sufficient, but it can also be beneficial to have more fast modulators. For any grid mesh architecture, the slow-fast phase shifter pair can be placed on the top and bottom arms (as shown in FIG. 4). More generally for full control of the network function in MZI meshes, we need one phase shifter on one arm inside the MZI (so, between the directional couplers), and another phase shifter either inside the MZI on the other arm or on another input or output waveguide of the MZI. For full control in this scheme with series phase shifters, we have the same requirements on the placement of the series pairs of phase shifters as we have in general for placement of phase shifters. FIG. 6 illustrates the example where we have phase shifter pairs in each arm inside the MZI, but one phase shifter pair could be moved to another input or output waveguide of the interferometer.

The phase shift induced by the fast phase shifter will typically not depend on the voltage V applied to the slow (or "static") phase shifter. However, the voltage change $\delta v_\theta$ required to make a given small phase change $\delta\theta$ in the slow phase shifter may vary as we change V. To use such a series phase shifter approach, we should preferably know this required voltage change $\delta v_\theta$ as a function of V so that we know how much voltage change $\delta v_\theta$ we should apply to get a phase change equal to (or proportional to) the actual phase change being made in the fast phase shifter. We can calibrate this $\delta v_\theta$ as a function of V once for a phase shifter, and use this information in calculating the required change in V to implement a given change in phase shift in setting the network.

E) Cost Functions and Measuring Units

For this scheme, we need a measuring unit at the end to be able to measure the cost function relatively easily, and to be able to detect changes in that function as we modulate elements in the network. Just what apparatus we need for this depends on the cost function. One option is an apparatus for the mean-squared cost function. We also discuss schemes for measuring another cost function, which we call here an "orthogonal" cost function, in more detail.

E1) Mean-Squared Cost Function

One possible cost function is a "mean squared" cost function $$\mathfrak{L}_{MS} = \frac{1}{2}(|X_L\rangle - |T\rangle)^\dagger(|X_L\rangle - |T\rangle) \tag{1}$$

In using this cost function, generally in optimizing we are trying to minimize its value in some way.

A vector of waveguide amplitudes of the form $(|X_L\rangle - |T\rangle)$ could be directly generated optically from the output vector $|X_L\rangle$ of modal amplitudes from the mesh. We would use an OSM to generate a vector of waveguide amplitudes $|T\rangle$ in a set of waveguides (we would use the same light source for this as used for the input vector generator OSM so that $|X_L\rangle$ and $|T\rangle$ were mutually coherent). Then we could use sets of 50:50 beam splitters to interfere the two vectors, element by element. One output of each beam splitter could generate the corresponding component of $(|X_L\rangle - |T\rangle)$ and the other would generate the corresponding component of $(|X_L\rangle + |T\rangle)$ (the meaning of the sign here really has to do with the relative phase of the light beams at the power inputs of the two OSMs here). We could put photodetectors on each of the $(|X_L\rangle - |T\rangle)$ waveguides and add the resulting electrical signals to generate an electrical signal proportional to $\mathfrak{L}$ giving us our desired measured result.

E2) "Orthogonal" Cost Function

Another cost function would be what we could call an "orthogonal" cost function. We take the power in some convenient units in a given vector of mode amplitudes $|Q\rangle$ to be $$P_Q = \langle Q||Q\rangle \equiv \langle Q|Q\rangle \tag{2}$$

where $\langle Q|$ (a row vector with complex-conjugated elements) is the Hermitian adjoint of $|Q\rangle$. In general, we can presume in optics that the power is proportional to the modulus squared of the electric field amplitude, at least when comparing fields in the same cross-section of waveguides made in the same material, so with $|Q\rangle$ representing the electric field mode amplitudes in the guides, Eq. (2) gives the power in some convenient units.

For the same mathematical vectors $|X_L\rangle$ and $|T\rangle$ as above, with our understanding of the power in a given vector as in Eq. (2), let us first formally define normalized versions of them (so "unit power" versions).

$$|\xi_L\rangle = \frac{|X_L\rangle}{\sqrt{\langle X_L | X_L\rangle}} \tag{3}$$

and $$|\tau\rangle = \frac{|T\rangle}{\sqrt{\langle T | T\rangle}} \tag{4}$$

We can now define our orthogonal cost function as $$\begin{aligned}\mathfrak{L}_\perp &= (|X_L\rangle - \langle\tau | \xi_L\rangle|X_L\rangle)^\dagger(|X_L\rangle - \langle\tau | \xi_L\rangle|X_L\rangle) \\ &= \langle X_L | X_L\rangle|1 - \langle\tau | \xi_L\rangle|^2 \equiv P_\perp\end{aligned} \tag{5}$$

This kind of cost function has a straightforward meaning. Essentially we are projecting out only the component of $|X_L\rangle$ that is orthogonal to $|T\rangle$ and measuring its power $P_\perp$. Possibly, a normalized version of this cost function is more useful, i.e., dividing by the total output power, which we take to be $$P_{XL} = \langle X_L/X_L\rangle \tag{6}$$

we have $$\mathfrak{L}_{\perp N} = |1 - \langle\tau | \xi_L\rangle|^2 \equiv \frac{P_\perp}{P_{XL}} \tag{7}$$

This cost function is the fraction of the output power from the mesh that is in a vector orthogonal to $|T\rangle$. Reducing $\mathfrak{L}_{\perp N}$ moves the vector $|X_L\rangle$ towards being in the same "direction" as $|T\rangle$ independent of the power of either of these. In using either of these cost functions, $\mathfrak{L}_\perp$ or $\mathfrak{L}_{\perp N}$, generally in optimization we are trying to minimize them.

If the direct goal of the output of the system is to categorize into "probabilities" that the input vector corresponds to one type of object or another, then $\mathfrak{L}_{\perp N}$ is a reasonable cost function. Indeed, that gives a very simple way to understand how to work with this cost function. Suppose in our simple 4-waveguide example that for the normalized target vectors we have the following simple mapping $$|\tau_{cat}\rangle \equiv \begin{bmatrix}1\\0\\0\\0\end{bmatrix} |\tau_{dog}\rangle \equiv \begin{bmatrix}0\\1\\0\\0\end{bmatrix} |\tau_{apple}\rangle \equiv \begin{bmatrix}0\\0\\1\\0\end{bmatrix} |\tau_{flower}\rangle \equiv \begin{bmatrix}0\\0\\0\\1\end{bmatrix} \tag{8}$$

So, the power in the top output waveguide gives the network's relative judgement that the input represents a cat, that in the second that the input represents a dog, that in the third that it represents an apple, and that in the fourth that it represents a flower. Then, the construction of the apparatus to measure $\mathfrak{L}_{\perp N}$ in each case is very straightforward, as is illustrated in FIG. 8.

Figure 8:
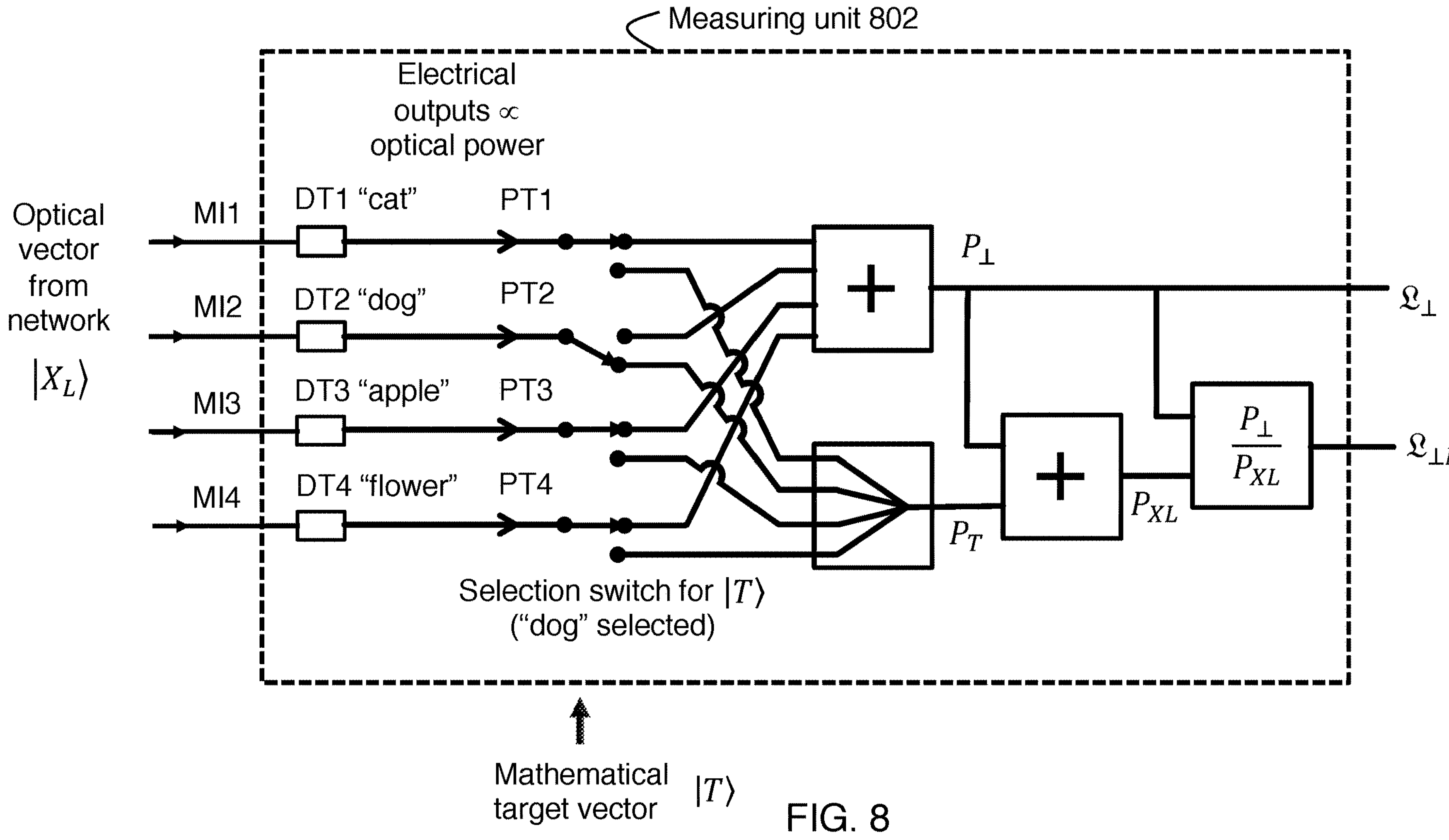
FIG. 8 shows an exemplary measuring unit for the case where the system is to perform direct categorization at its outputs.

FIG. 8 shows a measuring unit 802 for the simple case where the system is to perform direct categorization at the output. Boxes with a "+" in the middle perform a summation of the electrical signals entering at the left and present this as the output signal on the right. Selecting a specific one of the four possible target vectors by depressing the corresponding switch (and only one switch should be depressed at a time) gives the corresponding cost function output as an electrical signal.

In general, detectors DT1 to DT4 give electrical signals that are proportional to power; for the sake of definiteness, let us say these electrical signals proportional to power are voltages (we could also use currents, which are actually somewhat simpler to collect from reverse biased photodiodes as signals proportional to power). For simplicity, we will just refer to these electrical signals as "powers" (though they represent optical powers, not necessarily electrical ones).

Here, our choice of target vector is limited to just the four possibilities, labelled cat, dog, apple or flower. The "insertion" of the mathematical target vector into the measuring unit just corresponds to depressing the corresponding selection switch. In FIG. 8, we have selected "dog". Then, any power incident on the corresponding detector, here DT2, leads to a signal we could call $P_T$. We could directly use this signal $P_T$ as a cost function (different from the $\mathfrak{L}_{MS}$, $\mathfrak{L}_\perp$, or $\mathfrak{L}_{\perp N}$ discussed above), and in this case generally in optimization we would be trying to maximize this cost function. The signals from the other three detectors when added together give a signal $P_\perp$; this signal corresponds directly to the cost function $\mathfrak{L}_\perp$, and this could be available as an output signal as shown. Summing $P_T$ and $P_\perp$ gives the total power $P_{XL}$. Dividing $P_\perp$ by $P_{XL}$ to give a corresponding electrical signal gives the cost function $\mathfrak{L}_{\perp N}$ as an output signal.

Hence, for a network and measuring unit like this that is intended to perform the actual characterization, this output signal $\mathfrak{L}_{\perp N}$ is just the fractional weight the system gives to categorizing the original input signal as whatever "target" option was chosen (here "dog").

Electronic circuits to implement the additions are very straightforward (e.g., with simple operational amplifier circuits). Division is also relatively straightforward with some analog electronic circuits. The "divisor" power $P_{XL}$ only needs to be present as a time-averaged number—it does not need to follow the modulations of the signal by the various possible drive frequencies, so it can be essentially an averaged and relatively constant voltage that is fed into an appropriate divider circuit. As an alternative to performing an actual division, we could simply adjust the input source power to the mesh to keep the time-averaged total power signal $P_{XL}$ essentially constant in magnitude, and such an overall feedback control of power could be straightforward to implement.

Figure 9:
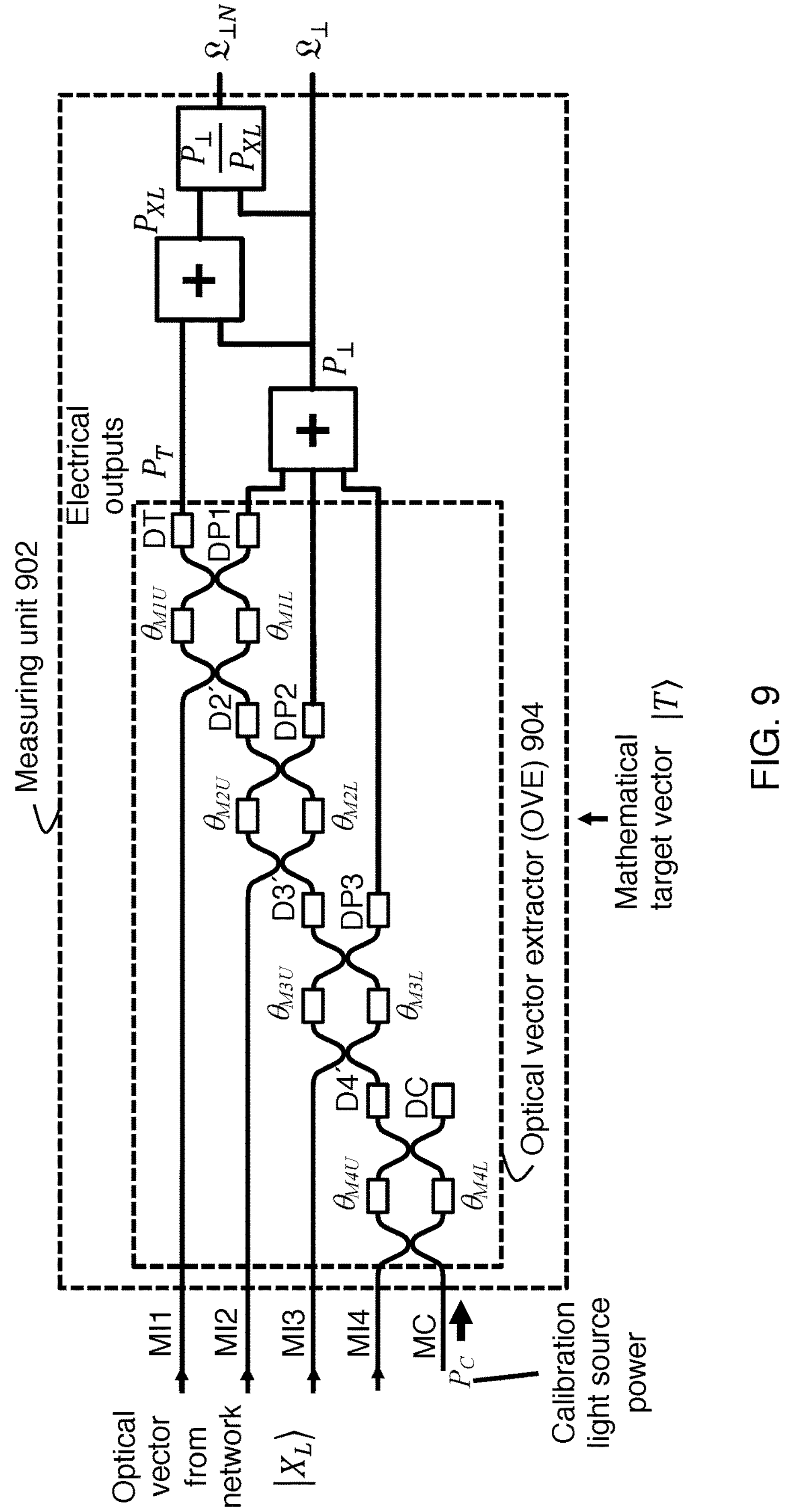
FIG. 9 shows an exemplary measuring unit for use with an arbitrary target vector.

If we want to have an unrestricted choice of target vectors $|T\rangle$ (so, not just cat, dog, apple and flower) we can use a system as in FIG. 9 for the measuring unit.

FIG. 9 shows a measuring unit 902 for use with an arbitrary target vector $|T\rangle$. The optical vector extractor (OVE) 904 is calibrated just like an OSM as described above using the calibration light source power $P_C$. After calibration, it can be programmed to extract the component of any desired target vector $|T\rangle$ from the input vector $|X_L\rangle$, which then passes into detector DT to give the electrical signal for the power $P_T$ of this extracted component. The remainder of the power passes into the detectors DP1, DP2, and DP3, and electronic processing as in FIG. 8 gives the corresponding electrical signals for the cost functions.

In this case, we use what we can call an "optical vector extractor" (OVE) 904. This OVE 904 is similar in many ways to the OSM 502 of FIG. 5. By shining a calibration power $P_C$ into the lowest input waveguide MC, we can progressively calibrate all the phase shifters θ in this row of interferometers as in an OSM. For the calibration, we require just one detector for each interferometer, so not all the detectors shown in FIG. 9 are necessary. We can presume for the moment that all the detectors are mostly transparent, so light can mostly pass through them (though in the end both detectors DC and DT can certainly be fully absorbing since we do not ultimately need any transmitted optical signal in either of those cases).

Having calibrated all the phase shifters, we can now turn off the power $P_C$. We calculate the settings for the phase shifters so that, if the input optical vector was some specific one of interest, say a vector $|T\rangle$, then all of the power associated with that vector would pass into the "top" output port (here with the detector DT). (Note in this case we will end up setting the lowest Mach-Zehnder interferometer so that it functioning only as a phase shifter, and if there were still any power from the calibration light source, it would just be dumped into detector DC). Any remaining light would pass into the detectors DP1, DP2 and DP3 giving electrical signals that can be summed to give $P_\perp$. Similar electrical summation and division as in FIG. 8 now gives the cost functions for this arbitrary target vector.

F) Averaging Over Multiple Training Examples

Machine learning training protocols typically involve optimizing the cost function over a large set of training examples. In 'supervised learning' protocols, these may be represented by input and target output pairs. When training the optical hardware on a machine learning task using gradient-based optimization, one therefore must compute the average gradient over a subset or "batch" of training examples, and use this "batch gradient" to update the phase shifters representing the weight matrices of the model. The backpropagation procedure in the literature and the scheme discussed above for parallelization of the measurement of gradients by use of different modulation frequencies both offer ways of computing and/or measuring the gradients of the cost function with respect to multiple controllable elements, but, as discussed so far, they perform this computation for just one such training example at a given time.

However, the same procedure may be extended to a set of training examples by using the measuring apparatus or devices to generate the desired averages over such training examples. Preferably, all the training examples in a given such set are intended to optimize the same cost function for the same target vector $|T\rangle$. Two basic approaches to such averaging include time-division multiplexing (TDM) and wavelength-division multiplexing (WDM). In such averaging approaches, when averaging over N training examples or vectors, the required number of measurements can be reduced by a factor of order N.

In a TDM approach, each training example or vector is sent sequentially into the network. The resulting detected signal from gradient measurements from the cost function and measurement apparatus as described above, or from measurements made inside the network in back-propagation schemes, is then averaged over multiple such training vectors by the measurement process. Hence the averaging is performed as part of the overall measurement process, and the results of that averaging measurement process are then used to calculate or deduce the corresponding averaged gradient or gradients of the cost function for the controllable element or elements in the network.

In a preferred embodiment of this TDM approach to averaging, the training examples or vectors are fed in at a much faster rate than the response time of the measurement system. For example, the rate at which different training examples or vectors are fed in may be chosen preferably to be much faster than any of the modulation frequencies $\omega_{lq}$. Then the resulting measurements of gradients deduced from measurements of the modulation of cost function at such modulation frequencies $\omega_{lq}$ will directly give a useful measure of the corresponding gradient averaged over such a set of training examples.

In a WDM approach, we can exploit the fact if networks of MZIs are fabricated with substantially equal optical path lengths for all different optical paths from the inputs to a given point in the network, then the network may have substantially similar response and behavior for optical wavelengths within a substantially wide range. We could expect such similarity of behavior over wavelength ranges of 10s of nanometers around about some underlying wavelength of the order of 1550 nm, for example, in a network designed with such substantial equality of optical path lengths. Then we can send in multiple training vectors at the same time, each on different wavelengths within such a substantially wide range. Such a WDM set of training vectors can be combined substantially without loss using WDM combining techniques known to those skilled in the art, including waveguide grating routers, for example. When such signals at multiple different wavelengths arrive at optical detectors, either within the network as in back-propagation schemes, or outside the network at some cost function or measuring unit, as long as the wavelengths are sufficiently different, the detector will simply add the signals corresponding to each of the different wavelengths, hence averaging the signals over the set of training vectors. A criterion for the wavelengths being sufficient different is that the beat frequency that would result from interfering different wavelengths is much higher than the electrical measurement bandwidth of the photodetector. Since wavelengths separated by nanometer scales in, say, the vicinity of 1550 nm free-space wavelength will have carrier frequencies that vary by numbers of 100 gigahertz or more, which would lead to beat frequencies similarly in the range of 100 gigahertz or more, such beat frequencies generally can lie well above the electrical bandwidth of optical photodetectors, which can be readily engineered using circuit design or other means to lie in ranges of megahertz or low gigahertz frequencies, for example.

G) Temporal Modulation of Optical Input

We can optionally usefully modulate the power or other attribute, such as phase, of the optical input vector at some other frequency $\omega_s$. This can be accomplished by modulating the input light source power $P_S$ as in FIG. 5 at frequency $\omega_S$. Then, as an alternative to looking directly for the modulation frequencies $\omega_{lq}$ when examining the cost function signal or signals, we can instead look for modulations at the sideband frequencies $\omega_s+\omega_{lq}$ or $\omega_S-\omega_{lq}$ since those will be generated as the modulated optical input power interacts with the modulated controllable elements. A benefit of this approach is that we can shift the frequency band of interest for measuring the cost function modulations into a more convenient frequency band, such as a higher frequency band. One reason for doing this is to move to higher frequencies where certain types of noise, such as the well-known 1/f noise, are weaker. This could be particularly useful if the frequencies $\omega_{lq}$ are chosen as low frequencies, such as frequencies in the range of 1 to 100 kHz, that are low enough to be usable with relatively slow phase shifting elements, such as some thermally or mechanically actuated elements.

The invention claimed is:

1. A method of training a photonic neural network, the method comprising:

providing an optical network having two or more optical inputs, two or more optical outputs and two or more control inputs, wherein control signals provided to the control inputs determine an input-output relation between the optical inputs and the optical outputs;

providing one or more predetermined input training patterns to the optical inputs of the optical network;

providing an adjustable output analyzer connected to the optical outputs of the optical network and configured to provide a cost function output;

simultaneously measuring two or more derivatives of the cost function with respect to the control signals as part of training the photonic neural network with the one or more predetermined input training patterns;

wherein the simultaneously measuring two or more derivatives of the cost function with respect to the control signals comprises dithering two or more of the control signals at two or more distinct dither frequencies and measuring corresponding distinct frequency components in the cost function output.

2. The method of claim 1, wherein two or more predetermined input training patterns are provided to the optical inputs of the optical network at various times, whereby the two or more derivatives of the cost function are analog time averages over the two or more predetermined input training patterns.

3. The method of claim 1, wherein two or more predetermined input training patterns are provided to the optical inputs of the optical network at two or more distinct wavelengths, whereby the two or more derivatives of the cost function are analog wavelength averages over the two or more predetermined input training patterns.

4. The method of claim 1, wherein the one or more predetermined input training patterns are provided as modulated input training patterns, whereby the corresponding distinct frequency components in the cost function output resulting from the two or more distinct dither frequencies are heterodyne shifted away from the two or more distinct dither frequencies.

5. The method of claim 1, further comprising adjusting the control signals to optimize the cost function with an optimization method that makes use of the two or more derivatives of the cost function with respect to the control signals, whereby the photonic neural network is trained according to the one or more predetermined input training patterns.

6. The method of claim 1, wherein the optical network includes two or more meshes of linear optical components connected in alternating series via one or more nonlinearity units, and wherein the control inputs include at least inputs to each of the two or more meshes of linear optical components.

7. The method of claim 1, wherein the optical network includes at least one optical element having a compound control input, wherein the compound control input includes a first input and a second input, wherein the first input has a lower bandwidth than the second input, and wherein a dither of the compound control input is delivered via the second input.

* * * * *